United States Patent [19]

Blake

[11] Patent Number: 4,787,359

[45] Date of Patent: Nov. 29, 1988

[54] EXHAUST/FUEL MIXER/VAPORIZER

[76] Inventor: Samuel J. Blake, 30 Westville Rd., Plaistow, N.H. 03865

[21] Appl. No.: 930,886

[22] Filed: Nov. 17, 1986

[51] Int. Cl.[4] .......................................... F02M 25/06
[52] U.S. Cl. ................................... 123/568; 123/557
[58] Field of Search ............... 123/531, 557, 568, 570, 123/585

[56] References Cited

U.S. PATENT DOCUMENTS

| 1,625,007 | 4/1927 | Weeber | 123/568 |
|---|---|---|---|
| 1,793,556 | 2/1931 | Moore | 123/568 |
| 2,071,116 | 2/1937 | French | 123/568 |
| 2,851,021 | 9/1958 | Covone | 123/570 X |
| 2,956,559 | 10/1960 | Johnson | 123/570 |
| 3,446,196 | 5/1969 | Daigh | 123/568 |
| 3,498,274 | 3/1970 | Chapman | 123/568 |
| 3,894,520 | 7/1975 | Clawson | 123/531 |

Primary Examiner—Willis R. Wolfe, Jr.
Attorney, Agent, or Firm—Leon Gilden

[57] ABSTRACT

Hot exhaust gases are directly mixed with fuel before injection into the intake manifold of an internal combustion engine driven vehicle. The exhaust gases effect a complete vaporization of the fuel before combustion, and mixing of the gases and fuel is accomplished through a Venturi nozzle. The fuel and gas mixture also passes through a length of coiled tubing prior to entry into the intake manifold, with this tubing allowing for additional mixing and drying of the gas and fuel mixture.

2 Claims, 1 Drawing Sheet

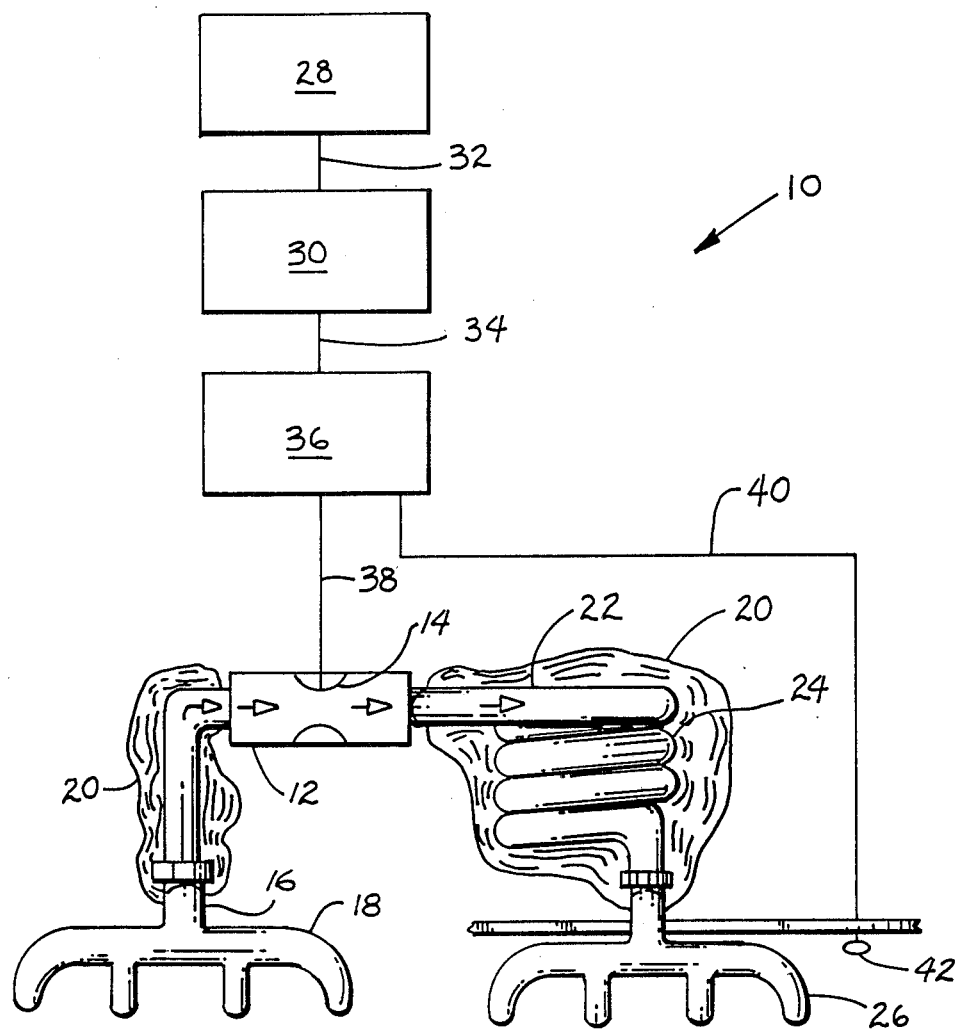

EXHAUST/FUEL MIXER/VAPORIZER

BACKGROUND OF THE INVENTION

1. Field of the Invention

The present invention relates to fuel mixtures for internal combustion engines, and more particularly pertains to the direct combining of hot exhaust gases and fuel in an engine to effect a complete vaporization of the fuel before combustion.

2. Description of the Prior Art

The use of various devices to effect a complete vaporization of fuel in an internal combustion engine before combustion is well known in the prior art. Further, a number of such devices rely upon the heat generated by the hot exhaust gases to effect such fuel vaporization. For example, reference is made to U.S. Pat. No. 1,547,474, which issued to G. Welch on July 28, 1925. In this device, fuel passes through a chamber lying proximate the exhaust manifold of a vehicle and is vaporized by the exhaust manifold heat. However, no direct intermixing of the exhaust gases and fuel is undertaken.

Similarly, U.S. Pat. No. 1,548,149, which issued to J. Losee on Aug. 4, 1925, discloses a further heater for vehicle intake manifolds wherein hot exhaust gases are passed along an exterior surface of the intake manifold, thereby to provide increased heat for effecting the desired fuel vaporization. As with the above-described device, no direct intermixing of the exhaust gases with the fuel vapors is accomplished.

A more recent fuel vaporization device which makes use of engine heat to effect such evaporation of fuel is to be found in U.S. Pat. No. 3,789,817, which issued to Morel et al on Feb. 5, 1974. The Morel et al device is representative of even further devices now known in the prior art which are designed to provide more efficient fuel vaporization and combustion so as to combat pollution. The device shown in this patent is of a substantially complex construction and utilizes electric resistance heating, as well as exhaust gas heat to accomplish a complete evaporation of the fuel prior to combustion. A complete fuel vaporization results in a more efficient and clean burning thereof in the engine combustion chambers, which in turn results in less pollutants being exhausted into the atmosphere. While no direct intermixing of exhaust gases and fuel is disclosed in this patent, it is representative of the need for also providing means for removing pollutants from exhaust gases. Ideally, exhaust gases from a perfect combustion process would have all hydrocarbons burned to thus eliminate virtually all solid atmospheric pollutants. Inasmuch as an ideal combustion process has not yet been perfected, there exists a continuing need for some means of providing a more complete and efficient combustion process to reduce pollutants and improve engine efficiency, and in this respect, the present invention substantially fulfills this need.

SUMMARY OF THE INVENTION

In view of the foregoing disadvantages inherent in the known types of fuel vaporization devices now present in the prior art, the present invention provides an improved fuel vaporization device and process whereby a more clean and efficient combustion of the fuel is realized, thereby to substantially reduce atmospheric pollution. As such, the general purpose of the present invention, which will be described subsequently in greater detail, is to provide a new and improved fuel vaporization device and process which has all the advantages of the prior art fuel vaporization devices and processes and none of the disadvantages.

To attain this, the present invention comprises the intermixing of hot exhaust gases with fuel being delivered to an engine intake manifold. This process results in a re-burning of a portion of the exhaust gases, thereby to more completely combust the hydrocarbons which are normally expelled as solid pollutants, and also utilizes the exhaust gases as a means of heating the fuel prior to combustion. This heating of the fuel effects a substantially complete vaporization thereof, thus to provide for a more efficient combustion process which in turn results in a cleaner exhaust gas product.

The apparatus of the invention utilizes a Venturi nozzle arrangement as a fuel and exhaust gas mixing chamber, thereby to utilize a Venturi effect for the intermixing of the gases and fuel, and further includes a coiled length of tubing which provides for additional intermixing of the gases and fuel. Further, the coiled tubing will accumulate and retain exhaust gas heat, thereby to provide for additional vaporization and drying of the fuel mixture. The fuel and gas mixture are then directly delivered to the intake manifold for combustion.

There has thus been outlined, rather broadly, the more important features of the invention in order that the detailed description thereof that follows may be better understood, and in order that the present contribution to the art may be better appreciated. There are, of course additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved process and apparatus for effecting fuel combustion which has all the advantages of the prior art processes and apparatuses for effecting fuel combustion and none of the disadvantages.

It is another object of the present invention to provide a new and improved process and apparatus for effecting fuel combustion which may be easily and efficiently manufactured and marketed.

It is a further object of the present invention to provide a new and improved process and apparatus for effecting fuel combustion which is of an efficient and reliable design.

An even further object of the present invention is to provide a new and improved process and apparatus for effecting fuel combustion which is susceptible of a low cost of manufacture with regard to both materials and labor, and which accordingly is then susceptible of low prices of sale to the consuming public, thereby making such process and apparatus for effecting fuel combustion economically available to the buying public.

Still yet another object of the present invention is to provide a new and improved process and apparatus for effecting fuel combustion which provides in the apparatuses and methods of the prior art some of the advantages thereof, while simultaneously overcoming some of the disadvantages normally associated therewith.

Still another object of the present invention is to provide a new and improved process and apparatus for effecting fuel combustion which utilizes the direct intermixing of fuel with hot exhaust gases.

Yet another object of the present invention is to provide a new and improved process and apparatus for effecting fuel combustion wherein a partial re-burning of engine exhaust gases is accomplished.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above wil become apparent when consideration is given to the following detailed description thereof. Such description makes reference to the annexed drawings wherein:

The FIGURE is a schematic representation of the process and apparatus comprising the present invention.

DESCRIPTION OF THE PREFERRED EMBODIMENT

With reference now to the drawing, and in particular to the Figure thereof, a new and improved process and apparatus for effecting fuel combustion embodying the principles and concepts of the present invention and generally designated by the reference numeral 10 will be described.

More specifically, it will be noted that the process and apparatus 10 comprising the invention essentially relies upon the use of a gas and fuel mixing chamber 12 having a Venturi nozzle 14 mounted therein. A conduit 16 is in fluid communication with the exhaust manifold 18 of an internal combustion engine, such as might be utilized in a vehicle or the like, and the conduit is appropriately insulated with a layer of heat resistant insulation 20. The conduit 16 is also in fluid communication with the mixing chamber 12 on an intake side thereof, while a further conduit 22 covered with insulation 20 is in fluid communication with the chamber on an outflow side thereof.

The conduit 22 incudes a coiled tubing section 24 and has its remaining free end attached to and in fluid communication with the engines's intake manifold 26. As such, hot exhaust gases may flow directly from the exhaust manifold 18 through the mixing chamber 12, and its associated Venturi nozzle 14, into the intake manifold 26.

The combination of the invention further includes a conventional engine fuel tank 28 and a fuel pump 30 which draws fuel from the tank through a conduit 32. Fuel is delivered from the fuel pump 30 through a conduit 34 to a metering device 36. The metering device 36 may be preset to deliver a selected amount of fuel through a conduit 38 into the mixing chamber 12, while some or all of the fuel delivered therefrom may also be directed through a further conduit 40 to the connection line 42 associated with a conventional unillustrated carburetor. The conduit 38 may extend through and be directly connected to the Venturi nozzle 14 so as to provide for efficient fuel delivery to the mixing chamber 12.

With respect to the manner of usage and operation of the present invention, the same should be apparent from the above-description. However, a brief summary thereof will be provided. More particularly, it will be observed that a portion of the hot exhaust gases passing through the exhaust manifold 18 will be directed upwardly through the conduit 16 and into the fuel and gas mixing chamber 12. The hot exhaust gases will accelerate when passing through the Venturi nozzle 14, with this gas acceleration resulting in a reduction of pressure within the nozzle orifice. As a result, a preselected amount of fuel will be drawn from the metering device 36 through the conduit 38 into fluid communication with the exhaust gases. The hot exhaust gases will effect substantially a complete vaporization of the fuel with the mixture then being directed into the conduit 22. The coiled section 24 of the conduit 22 is appropriately covered with the aforementioned insulation 20 which results in the tubing retaining heat. As such, further drying and vaporization of the fuel mixed with the exhaust gasses is accomplished, with the entire mixture then being delivered into the intake manifold 26 for fuel combustion. As above-discussed, this complete vaporization of the fuel results in a cleaner and more efficient combustion process, which in turn results in a more clean exhaust product. This exhaust product, which essentially comprises the exhaust gases contained in the exhaust manifold 18, is then nearly free of unburned hydrocarbons. To further lessen the effect of atmospheric pollution, the portion of the exhaust gases directed through the mixing chamber 12 will be subjected to a reburning process, thereby to more completely eliminate unburned pollutants.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. An apparatus for improving fuel vaporization prior to combustion in an internal combustion engine, said apparatus comprising:
   a. fuel supply means comprising a fuel tank, a fuel pump, and a metering means;
   b. mixing chamber means;
   c. exhaust gas delivery means in fluid communication with said mixing chamber means, said exhaust gas delivery means comprising a first conduit extending between an exhaust manifold and said mixing chamber means;
   d. fuel delivery means in fluid communication with said mixing chamber means, said fuel delivery means comprising a second conduit interconnected between said fuel supply means and said mixing chamber means;
   e. venturi nozzle means positioned in said mixing chamber means, said exhaust gas and said fuel being intermixed in said Venturi nozzle means; and,
   f. additional fuel vaporization means comprising a coiled conduit through which said intermixed exhaust gas and fuel passes.

2. The apparatus for improving fuel vaporization prior to combustion in an internal combustion engine of claim 1, wherein said coiled conduit is fluidly interconnected with an intake manifold associated with said internal combustion engine.

* * * * *